(12) United States Patent
Ramaswamy et al.

(10) Patent No.: US 12,009,993 B2
(45) Date of Patent: Jun. 11, 2024

(54) SYSTEMS AND METHODS FOR SELECTING A MACHINE LEARNING MODEL AND TRAINING IMAGES FOR THE MACHINE LEARNING MODEL

(71) Applicant: Verizon Patent and Licensing Inc., Basking Ridge, NJ (US)

(72) Inventors: Karthik Ramaswamy, Coppell, TX (US); Stephen C. Opferman, Denver, CO (US); Felipe Castro, Erie, CO (US); Sivanaga Ravi Kumar Chunduru Venkata, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/664,949

(22) Filed: May 25, 2022

(65) Prior Publication Data
US 2023/0412469 A1    Dec. 21, 2023

(51) Int. Cl.
| | |
|---|---|
| *H04L 41/16* | (2022.01) |
| *H04L 43/0823* | (2022.01) |
| *H04L 43/0829* | (2022.01) |
| *H04L 67/101* | (2022.01) |
| *H04W 24/08* | (2009.01) |

(52) U.S. Cl.
CPC .......... *H04L 41/16* (2013.01); *H04L 43/0829* (2013.01); *H04L 43/0847* (2013.01); *H04L 67/101* (2013.01); *H04W 24/08* (2013.01)

(58) Field of Classification Search
CPC ... H04L 41/16; H04L 43/0829; H04L 67/101; H04W 24/08
See application file for complete search history.

(56) References Cited

U.S. PATENT DOCUMENTS

| | | | |
|---|---|---|---|
| 11,102,269 B1* | 8/2021 | Gupta | H04N 21/23614 |
| 2019/0370218 A1* | 12/2019 | Di Pietro | G06F 18/2178 |
| 2020/0322694 A1* | 10/2020 | Colligan | H04N 21/8547 |
| 2021/0201075 A1* | 7/2021 | Pahde | G06T 17/20 |
| 2021/0327018 A1* | 10/2021 | Carranza | G06T 1/20 |
| 2021/0374931 A1* | 12/2021 | Kumar | G06T 7/0002 |
| 2022/0286402 A1* | 9/2022 | Wang | H04L 47/11 |
| 2023/0107309 A1* | 4/2023 | Patel | G06N 20/00 706/12 |

\* cited by examiner

*Primary Examiner* — Hitesh Patel
*Assistant Examiner* — Eui H Kim (57) ABSTRACT

A device may receive network data identifying at least one of a signal-to-interference-plus-noise ratio (SINR), a bit error rate (BER), a packet loss, or a frame loss associated with a radio access network (RAN), and may receive model data associated with a plurality of machine learning models. The device may receive inference confidence scores associated with the plurality of machine learning models, and may process the network data, the model data, and the inference confidence scores, with a model, to select a machine learning model from the plurality of machine learning models. The device may cause the selected machine learning model to be implemented in connection with processing images.

20 Claims, 9 Drawing Sheets

SYSTEMS AND METHODS FOR SELECTING A MACHINE LEARNING MODEL AND TRAINING IMAGES FOR THE MACHINE LEARNING MODEL

BACKGROUND

A user equipment (UE) may utilize a wireless network (e.g., a radio access network (RAN)) to attach to a core fourth-generation (4G) network or a core fifth-generation (5G) network. A UE may utilize the RAN to transmit traffic to other UEs or other devices (e.g., multi-access edge computing (MEC) devices) and/or to receive traffic from the other UEs or the other devices.

DETAILED DESCRIPTION OF EXAMPLE EMBODIMENTS

The following detailed description of example implementations refers to the accompanying drawings. The same reference numbers in different drawings may identify the same or similar elements.

In an edge use case, an MEC device may stream data (e.g., video data) to a UE via the RAN. In another example, a UE (e.g., a video camera) may transmit high throughput data (e.g., video data) through the RAN to the MEC device, another UE, or another device. In many edge use cases, a machine learning model (e.g., a computer vision machine learning model) may be implemented in an MEC device for processing images associated with the video data. The processing by the MEC device may reduce a quantity of data (e.g., images) transferred between a cloud environment and the MEC device. However, any time that performance of the MEC device declines, the data may be transferred from the MEC device to the cloud environment for machine learning model training and/or updates. Furthermore, the more the machine learning model is updated, the larger the machine learning model may become. A large machine learning model may require more computing resources and more expensive processing at the MEC device. Constant transfer of data for machine learning model training and/or updates may further increase costs. A quality of the data transmitted through the RAN to the machine learning model may depend upon environmental conditions associated with the RAN. For example, the data may experience wireless interference associated with the RAN, congestion associated with the RAN, packet loss associated with the RAN, and/or the like, which reduces the quality of the data transmitted to the machine learning model. A computer vision machine learning model may depend upon the quality of images provided to the computer vision machine learning model, and the quality of the images may depend upon the environmental conditions associated with the RAN.

Thus, current mechanisms for training a machine learning model with images consume computing resources (e.g., processing resources, memory resources, communication resources, and/or the like), networking resources, and/or other resources associated with utilizing limited computing resources to train a machine learning model, utilizing poor quality training data (e.g., images) to train the machine learning model, generating incorrect results with the poorly trained machine learning model, generating a machine learning model that is too large to manage, and/or the like.

Some implementations described herein provide an optimization system that selects a machine learning model and training images for the machine learning model. For example, the optimization system may receive network data identifying at least one of a signal-to-interference-plus-noise ratio (SINR), a bit error rate (BER), a packet loss, or a frame loss associated with a RAN, and receive model data associated with a plurality of machine learning models. The optimization system may receive inference confidence scores associated with the plurality of machine learning models, and may process the network data, the model data, and the inference confidence scores, with a model, to select a machine learning model from the plurality of machine learning models. The optimization system may cause the selected machine learning model to be implemented by an MEC device associated with the RAN, and may receive image data identifying images to be processed by the selected machine learning model. The optimization system may receive an inference confidence score associated with a quality of the image data, and may process the network data, the image data, and the inference confidence score, with another model, to select images, from the image data, for training the selected machine learning model. The optimization system may provide the selected images to the selected machine learning model for training.

In this way, the optimization system selects a machine learning model and training images for the machine learning model. For example, the optimization system may select a machine learning model, from a plurality of machine learning models, based on network data associated with a RAN (e.g., an SINR, a BER, a packet loss, frame loss, and/or the like associated with the RAN). The optimization system may select one or more images, from a plurality of images, based on the network data associated with the RAN. The optimization system may provide the one or more images to the selected machine learning model for training and/or for developing one or more new machine learning models. Thus, the optimization system may conserve computing resources, networking resources, and/or other resources that would otherwise have been consumed in utilizing limited computing resources to train a machine learning model, utilizing poor quality training data (e.g., images) to train the machine learning model, generating incorrect results with the poorly trained machine learning model, generating a machine learning model that is too large to manage, and/or the like.

Figure 1A:
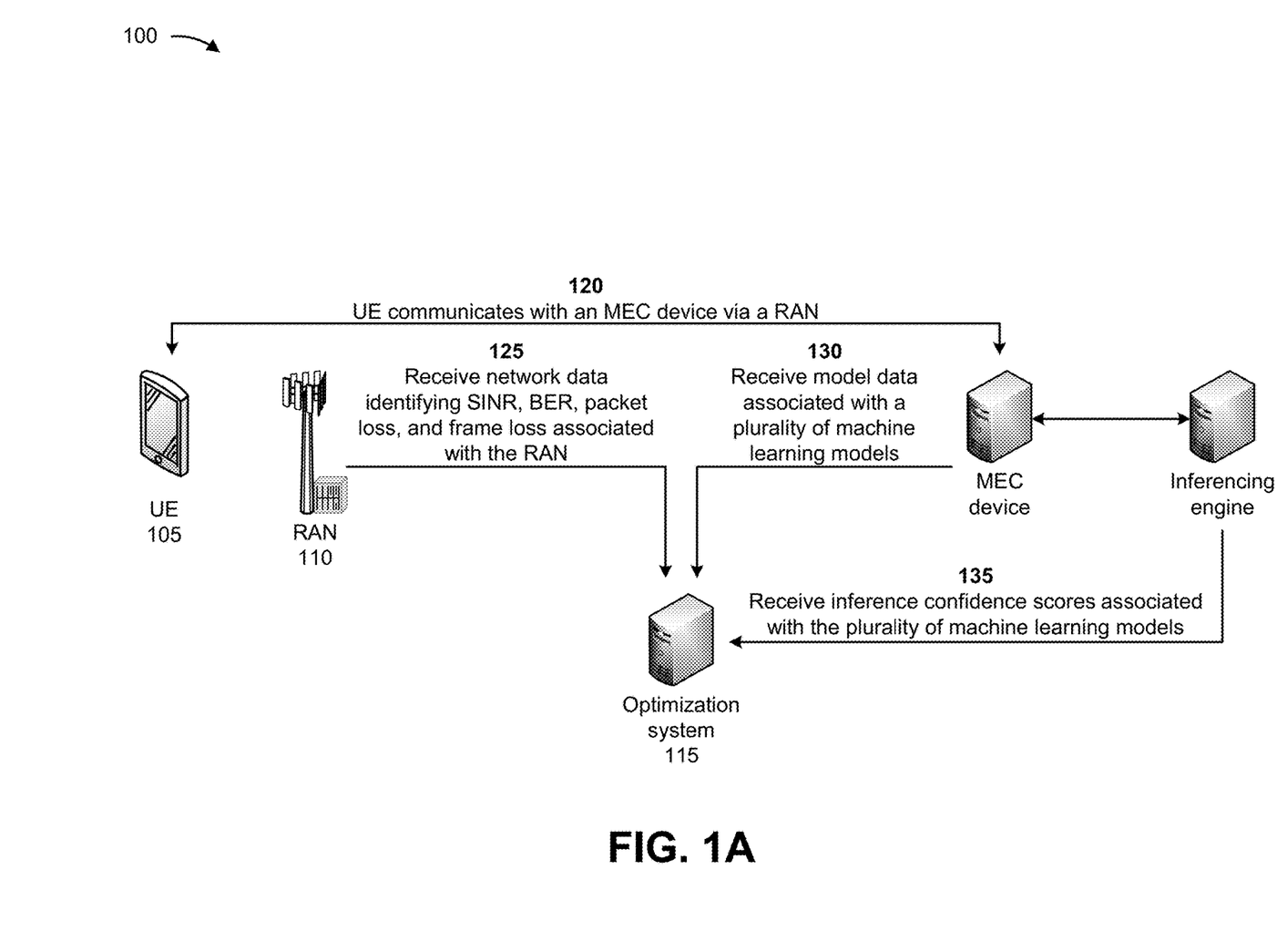
FIGS. 1A-1F are diagrams of an example associated with selecting a machine learning model and training images for the machine learning model.

FIGS. 1A-1F are diagrams of an example 100 associated with identifying and correcting issues associated with a wireless network. As shown in FIGS. 1A-1F, example 100 includes a UE 105, a RAN 110, an optimization system 115, an MEC device, and an inferencing engine. Further details of the UE 105, the RAN 110, the optimization system 115, the MEC device, and the inferencing engine are provided elsewhere herein. Although only a single UE 105 is depicted in FIG. 1A, in some implementations multiple UEs 105 may be associated with the RAN 110.

As shown in FIG. 1A, and by reference number 120, the UE 105 may communicate with the MEC device via the RAN 110. For example, the UE 105 may establish a session with the MEC device, via the RAN 110, and may communicate with the MEC device via the session. In some implementations, multiple UEs 105 may utilize the RAN 110 to communicate with the MEC device, other MEC devices, a core network, a data network, and/or the like. Such communications may generate traffic that causes the RAN 110 to experience an SINR, a BER, congestion, throughput, latency, packet loss, a frame loss, and/or the like.

As further shown in FIG. 1A, and by reference number 125, the optimization system 115 may receive network data identifying an SINR, a BER, a packet loss, and a frame loss associated with the RAN 110. For example, the optimization system 115 may receive, from the RAN 110, the SINR, the BER, the packet loss, and the frame loss associated with the RAN 110. The SINR may include a quantity used to provide upper bounds on channel capacity, or a rate of information transfer, in the RAN 110. The SINR may be defined as a power of a signal of interest divided by a sum of an interference power (from all other interfering signals) and a power of background noise. The BER may include a quantity of bit errors per unit time. The BER may calculated by dividing the quantity of bit errors by a total quantity of transferred bits during a time interval. The packet loss may occur when one or more transmitted data packets fail to arrive at a destination, which can cause noticeable performance issues for all types of communications. The frame loss may include a quantity of frames that were transmitted successfully from a source but were never received at a destination. The frame loss may be referred to as frame loss rate and may be expressed as a percentage of a total quantity of frames transmitted.

As further shown in FIG. 1A, and by reference number 130, the optimization system 115 may receive model data associated with a plurality of machine learning models. For example, the MEC device may utilize a plurality of machine learning models (e.g., computer vision models) that process data (e.g., images and/or video) to generate results (e.g., image recognition, autonomous vehicle instructions, and/or the like). The MEC device may utilize different models of the plurality of machine learning models based on the type of data to be processed. The MEC device may provide the model data associated with the plurality of machine learning models to the optimization system 115, and the optimization system 115 may receive the model data. The model data may include data identifying parameters of the plurality of machine learning models, required input data for the plurality of machine learning models, output data to be generated by the plurality of machine learning models based on the input data, historical latency data associated with the plurality of machine learning models, historical computing resource usage data associated with the plurality of machine learning models, historical storage usage data associated with the plurality of machine learning models, and/or the like.

As further shown in FIG. 1A, and by reference number 135, the optimization system 115 may receive inference confidence scores associated with the plurality of machine learning models. For example, the inferencing engine may include a machine learning model that processes the network data and/or the model data and predicts whether the plurality of machine learning models will generate correct results (e.g., correct image recognition, correct autonomous vehicle instructions, and/or the like) based on processing the network data and/or the model data. The machine learning model may also predict confidence scores associated with the plurality of machine learning models. For example, the inferencing engine may predict confidence scores indicating whether the plurality of machine learning models will generate correct or optimum results based on the network data utilized to calculate the results.

Figure 1B:
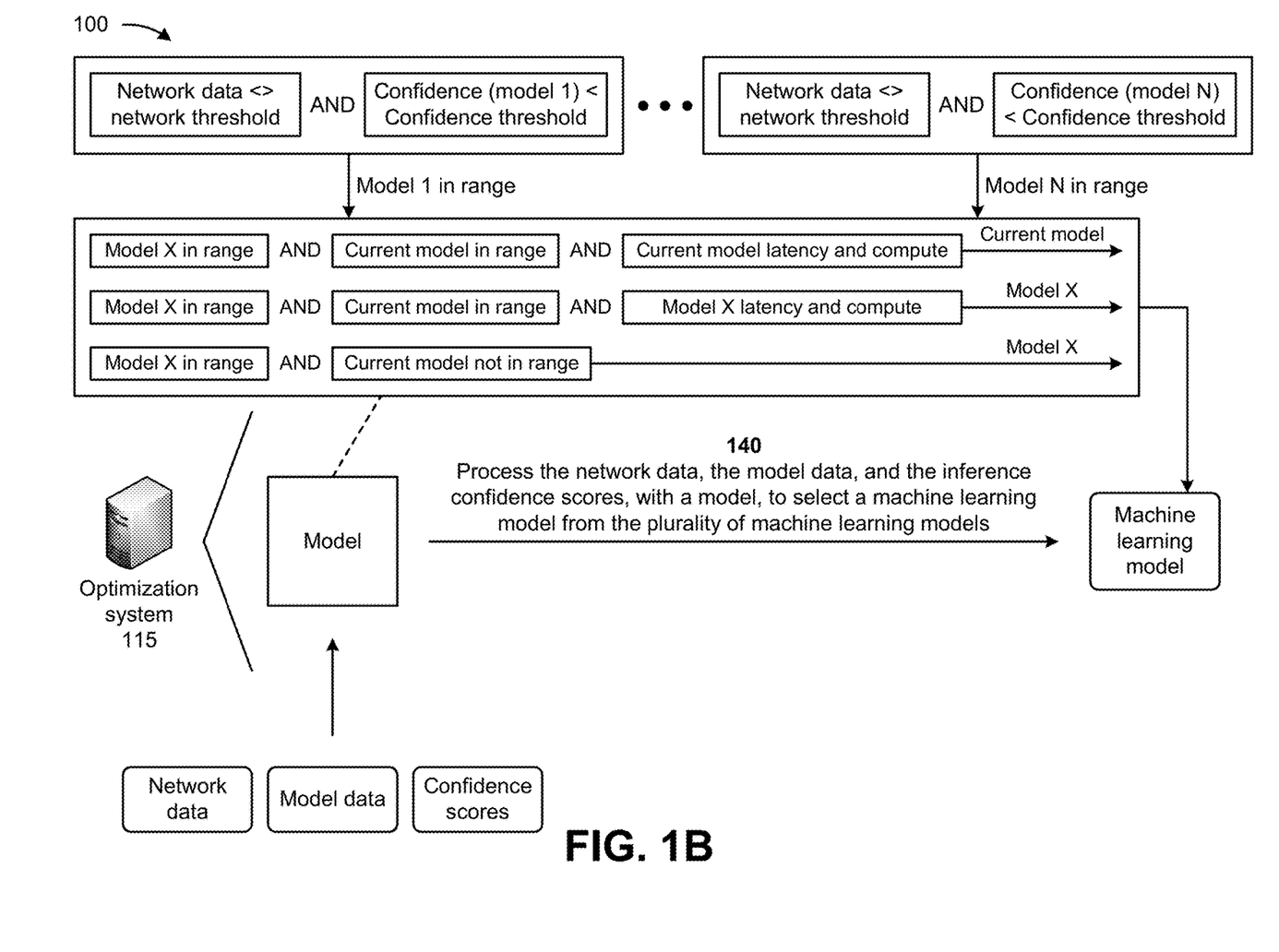

As shown in FIG. 1B, and by reference number 140, the optimization system 115 may process the network data, the model data, and the inference confidence scores, with a model, to select a machine learning model from the plurality of machine learning models. For example, the model may determine, for each of the plurality of machine learning models (e.g., models 1 through N), whether values of the network data are greater than a first network threshold and less than a second network threshold and whether the inference confidence scores are less than a confidence threshold. If the network data is greater than the first network threshold and less than the second network threshold and the inference confidence score is less than the confidence threshold, for a particular machine learning model of the plurality of machine learning models, the model may determine that the particular machine learning model is in range (e.g., may be considered for selection). If the network data is less than or equal to the first network threshold, the network data is greater than or equal to the second network threshold, or the inference confidence score is greater than or equal to the confidence threshold, for the particular machine learning model, the model may determine that the particular machine learning model is not in range.

In some implementations, the network threshold may include first and second SINR thresholds to be compared to the SINR associated with the RAN 110, first and second BER thresholds to be compared to the BER associated with the RAN 110, first and second packet loss thresholds to be compared to the packet loss associated with the RAN 110, and/or first and second frame loss thresholds to be compared to the frame loss associated with the RAN 110. For example, the model may determine, for each of the plurality of machine learning models, whether the SINR associated with the RAN 110 is greater than the first SINR threshold and less than a second SINR threshold, and whether the BER associated with the RAN 110 is greater than the first BER threshold and less than the second BER threshold. The model may determine, for each of the plurality of machine learning models, whether the packet loss associated with the RAN 110 is greater than the first packet loss threshold and less than the second packet loss threshold, and whether the frame loss associated with the RAN 110 is greater than the first frame loss threshold and less than the second frame loss threshold.

The model may compare a performance of a previously selected model (e.g., Model X) and a predicted performance of a current model in range (e.g., Model 1, Model 2, . . . , or Model N) based on the network data, the model data (e.g., historical latency data, historical computing resource usage data, and historical storage usage data), and the inference confidence scores associated with the previously selected model and the current model in range. If the performance of the current model in range is better than the performance of the previously selected model, the model may select the current model in range as the selected machine learning model. If the performance of the current model in range is worse than the performance of the previously selected model, the model may select the previously selected model as the selected machine learning model. If the current model is not in range (e.g., not satisfying one or more of the thresholds associated with the network data, the model data, and/or the inference confidence scores), the model may select the previously selected model as the selected machine learning model. In some implementations, the model may select, as the selected machine learning model, one of the plurality of machine learning models with a least historical latency, a least historical computing resource usage, or a least historical storage usage.

Figure 1C:
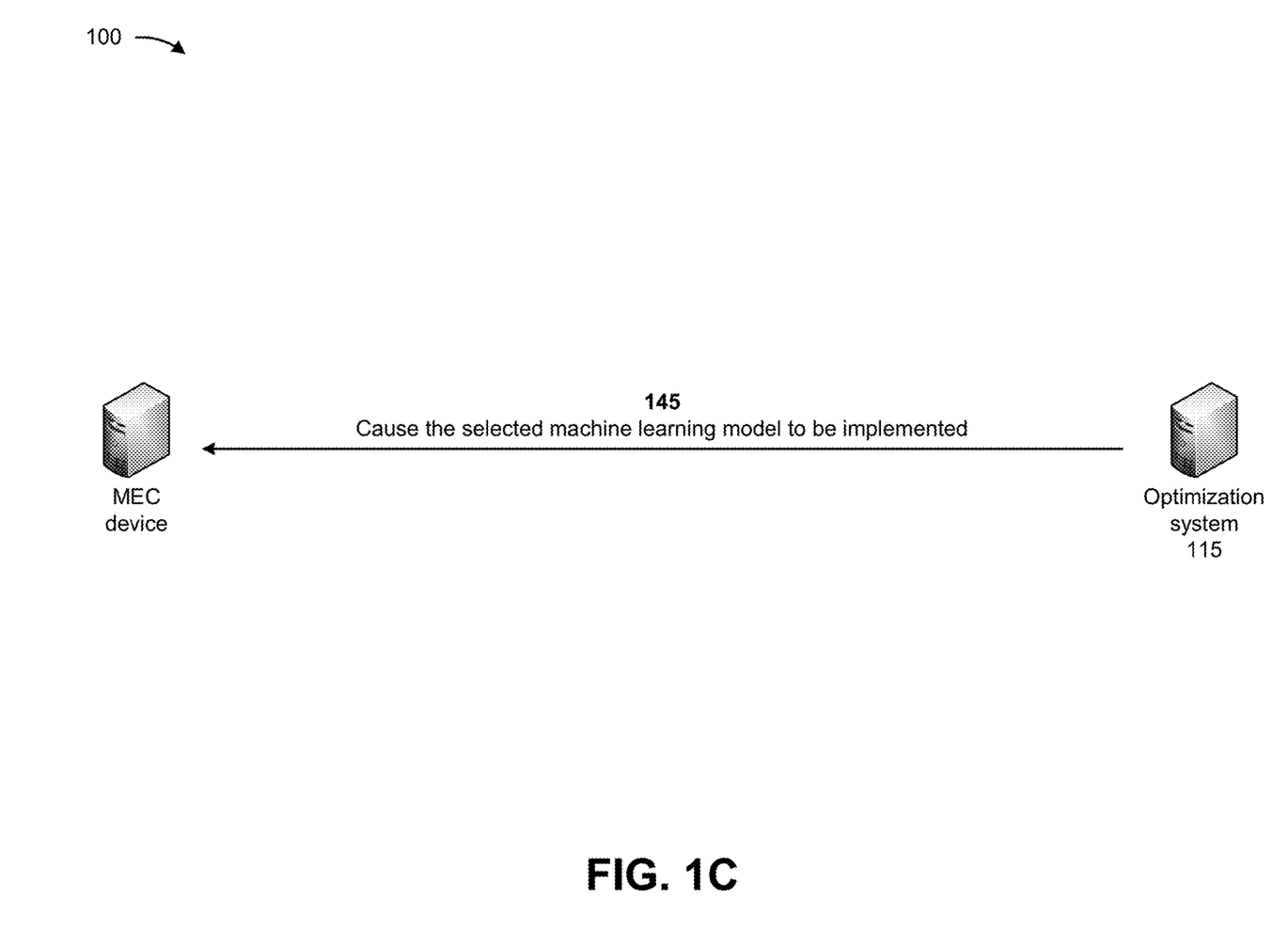

As shown in FIG. 1C, and by reference number 145, the optimization system 115 may cause the selected machine learning model to be implemented by the MEC device. For example, the optimization system 115 may provide the selected machine learning model to the MEC device, and the MEC device may utilize the selected machine learning model to process data (e.g., images and/or videos) and generate results (e.g., image recognition, autonomous vehicle instructions, and/or the like). In some implementations, the optimization system 115 may receive updated network data and updated inference confidence scores, and may process the updated network data, the model data, and the updated inference confidence scores, with the model, to select another machine learning model from the plurality of machine learning models. The optimization system 115 may cause the selected other machine learning model to be implemented by the MEC device.

Figure 1D:
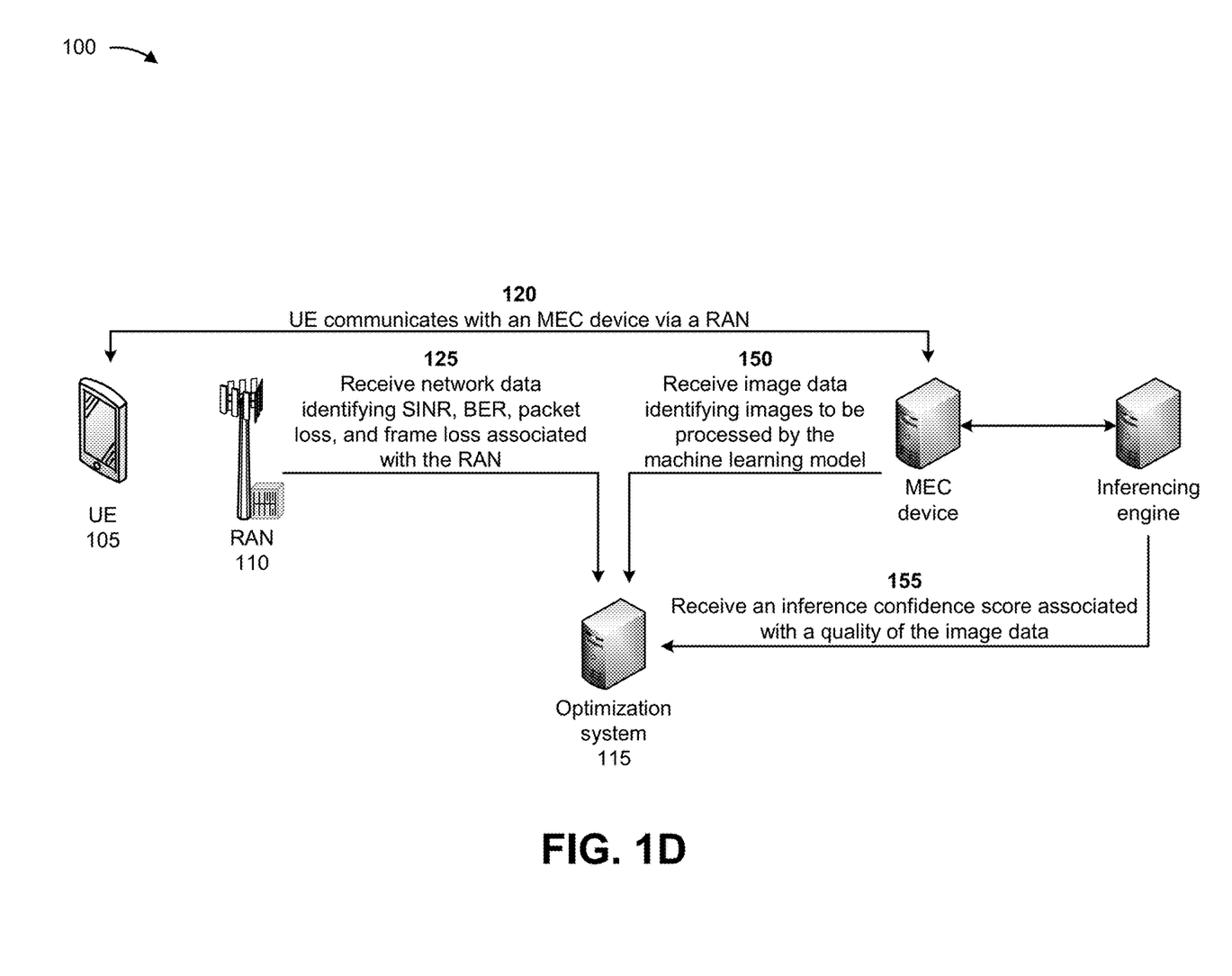

As shown in FIG. 1D, and by reference numbers 120 and 125, the UE 105 may communicate with the MEC device via the RAN 110, and the optimization system 115 may receive the network data identifying the SINR, the BER, the packet loss, and the frame loss associated with the RAN 110. Details of reference numbers 120 and 125 are described above in connection with FIG. 1A.

As further shown in FIG. 1D, and by reference number 150, the optimization system 115 may receive image data identifying images to be processed by the selected machine learning model. For example, the MEC device may utilize the image data to train the selected machine learning model (e.g., a computer vision model) that processes data (e.g., images and/or video) to generate results (e.g., image recognition, autonomous vehicle instructions, and/or the like). The training of the selected machine learning model may rely on the quality of the image data and the quality of the image data may rely on the network data. The MEC device may provide the image data identifying the images to be processed by the selected machine learning models to the optimization system 115, and the optimization system 115 may receive the image data. The image data may identify images, video, and/or the like to be utilized to train the selected machine learning model for a task (e.g., image recognition, generation of autonomous vehicle instructions, and/or the like).

As further shown in FIG. 1D, and by reference number 155, the optimization system 115 may receive an inference confidence score associated with a quality of the image data. For example, the inferencing engine may include a machine learning model that processes the network data and/or the image data and predicts a quality of the image data based on processing the network data and/or the image data. The machine learning model may also predict confidence scores associated with the quality of the image data. For example, the inferencing engine may predict confidence scores indicating whether the quality of one or more images of the image data is poor, intermediate, or high based on the network data utilized to calculate the quality. Poor quality image data may result in a poorly trained selected machine learning model, which may result in poor output generated by the selected machine learning model.

Figure 1E:
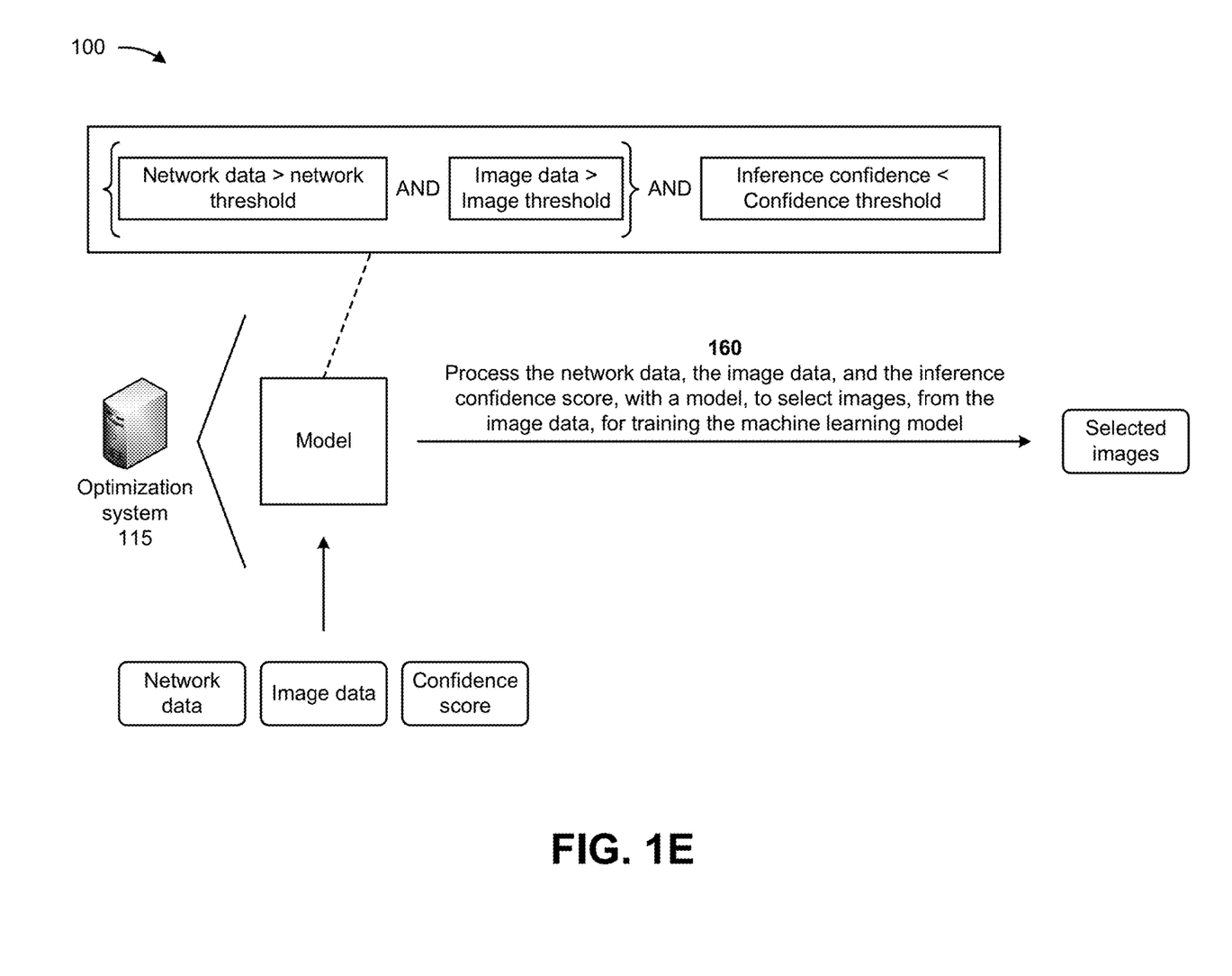

As shown in FIG. 1E, and by reference number 160, the optimization system 115 may process the network data, the image data, and the inference confidence score, with another model, to select images, from the image data, for training the machine learning model. For example, the model may determine, for each of the images, whether the network data is greater than a network threshold, whether the image data is greater than an image threshold, and whether the inference confidence score is less than a confidence threshold. If the network data is greater than the network threshold, the image data is greater than the image threshold, and the inference confidence score is less than the confidence threshold, for a particular image, the model may select the particular image as training data for the selected machine learning model. If the network data is less than or equal to the network threshold, the image data is less than or equal to the image threshold, or the inference confidence score is greater than or equal to the confidence threshold, for the particular image, the model may not select the particular image as training data for the selected machine learning model.

In some implementations, the network threshold may include an SINR threshold to be compared to the SINR associated with the RAN 110, a BER threshold to be compared to the BER associated with the RAN 110, a packet loss threshold to be compared to the packet loss associated with the RAN 110, and/or a frame loss threshold to be compared to the frame loss associated with the RAN 110. For example, the model may determine, for each of the images, whether the SINR associated with the RAN 110 is greater than the SINR threshold, and whether the BER associated with the RAN 110 is greater than the BER threshold. The model may determine, for each of the images, whether the packet loss associated with the RAN 110 is greater than the packet loss threshold, and whether the frame loss associated with the RAN 110 is greater than the frame loss threshold.

In some implementations, the image threshold may include a quality threshold associated with the image data. For example, the quality threshold may be associated with one or more image quality metrics that measure specific types of degradation (e.g., blurring, blocking, ringing, and/or the like) of an image. Thus, the model may determine, for each of the images, whether a quality of an image is greater than (e.g., satisfies) the quality threshold (e.g., a blurring threshold, a blocking threshold, a ringing threshold, and/or the like).

Figure 1F:
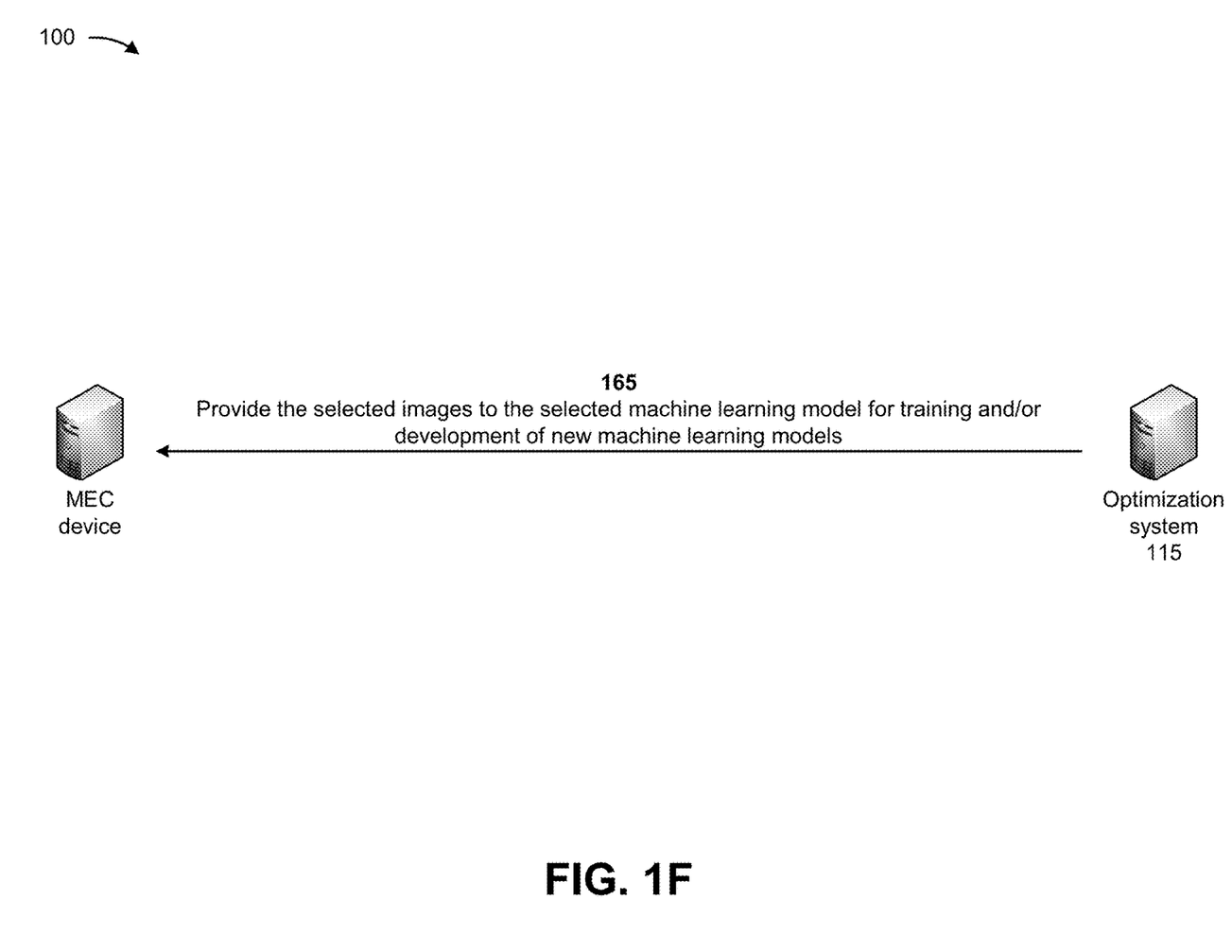

As shown in FIG. 1F, and by reference number 165, the optimization system 115 may provide the selected images to the selected machine learning model for training and/or development of new machine learning models. For example, the optimization system 115 may provide the selected images to the MEC device, and the MEC device may utilize the selected images to train the selected machine learning model to process data (e.g., images and/or videos) and generate results (e.g., image recognition, autonomous vehicle instructions, and/or the like). In some implementations, the MEC device may utilize the selected images to develop one or more new machine learning models based on the selected machine learning model and the selected images (e.g., used as training data). In some implementations, the MEC device may switch the selected machine learning model to another machine learning model, may utilize outputs of the selected machine learning to feed another machine learning model, and/or the like. In some implementations, the optimization system 115 may utilize the selected images to train the selected machine learning model and generate a trained machine learning model. The optimization system 115 may provide the trained machine learning model to the MEC device for utilization. In some implementations, the optimization system 115 may receive updated network data, updated image data, and an updated inference confidence score, and may process the updated network data, the updated image data, and the updated inference confidence score, with the other model, to select additional images for training the selected machine learning model. The optimization system 115 may provide the additional images to the selected machine learning model for training and/or development of one or more new machine learning models.

In this way, the optimization system 115 selects a machine learning model and training images for the machine learning model. For example, the optimization system 115 may select a machine learning model, from a plurality of machine learning models, based on network data associated with the RAN 110 (e.g., an SINR, a BER, a packet loss, frame loss, and/or the like associated with the RAN 110). The optimization system 115 may select one or more images, from a plurality of images, based on the network data associated with the RAN 110. The optimization system 115 may provide the one or more images to the selected machine learning model for training and/or for developing one or more new machine learning models. Thus, the optimization system 115 may conserve computing resources, networking resources, and/or other resources that would otherwise have been consumed in utilizing limited computing resources to train a machine learning model, utilizing poor quality training data (e.g., images) to train the machine learning model, generating incorrect results with the poorly trained machine learning model, generating a machine learning model that is too large to manage, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
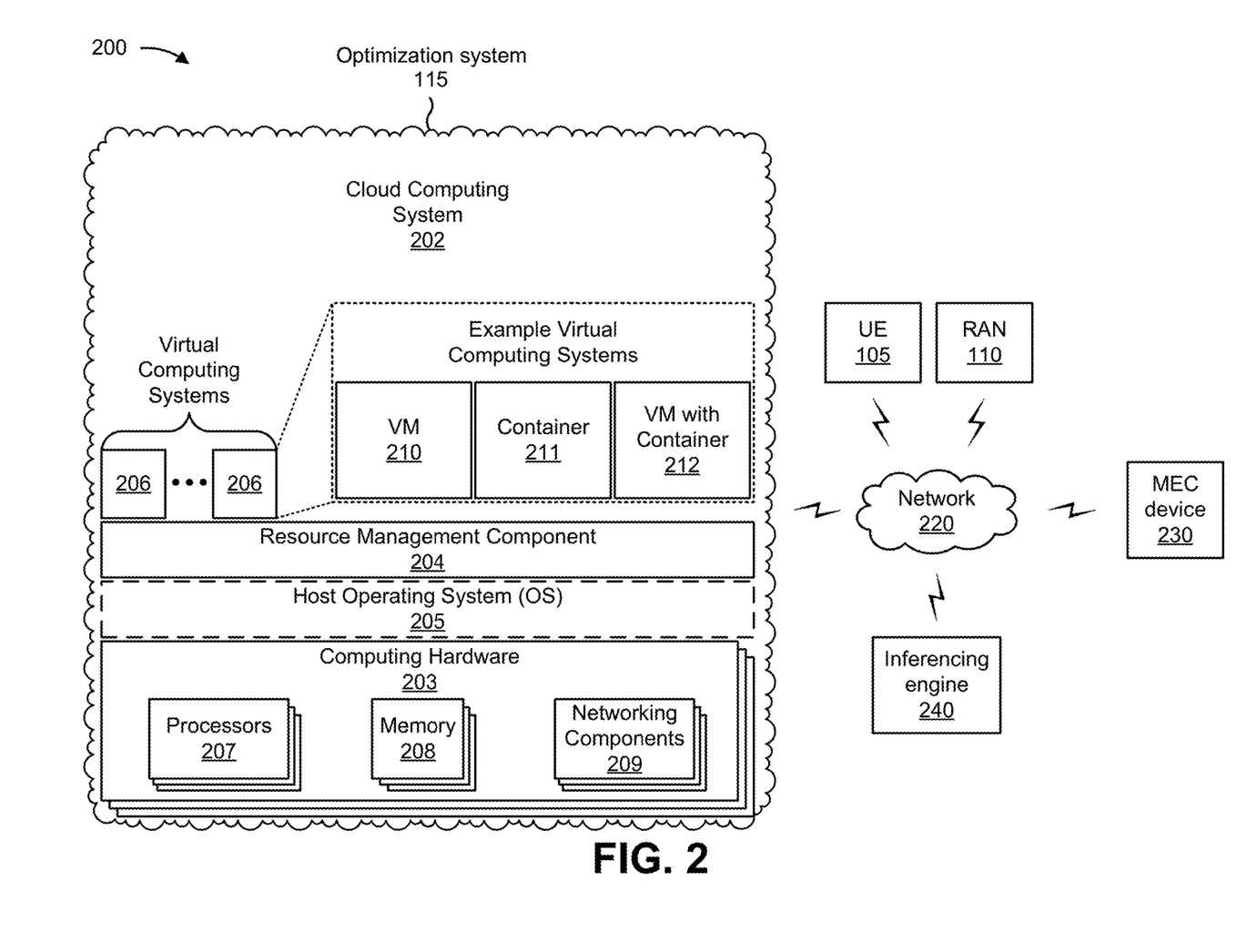
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the optimization system 115, which may include one or more elements of and/or may execute within a cloud computing system 202. The cloud computing system 202 may include one or more elements 203-212, as described in more detail below. As further shown in FIG. 2, the environment 200 may include the UE 105, the RAN 110, a network 220, an MEC device 230, and/or an inferencing engine 240. Devices and/or elements of the environment 200 may interconnect via wired connections and/or wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or a core network. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using the computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the optimization system 115 may include one or more elements 203-212 of the cloud computing system 202, may execute within the cloud computing system 202, and/or may be hosted within the cloud computing system 202, in some implementations, the optimization system 115 may not be cloud-based (e.g., may be implemented outside of a cloud computing system) or may be partially cloud-based. For example, the optimization system 115 may include one or more devices that are not part of the cloud computing system 202, such as a device 300 of FIG. 3, which may include a standalone server or another type of computing device. The optimization system 115 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The MEC device 230 includes one or more devices capable of receiving, generating, storing, processing, providing, and/or routing information, as described elsewhere herein. The MEC device 230 may include a communication device and/or a computing device. For example, the MEC device 230 may include a server, such as an application server, a client server, a web server, a database server, a host server, a proxy server, a virtual server (e.g., executing on computing hardware), or a server in a cloud computing system. In some implementations, the MEC device 230 includes computing hardware used in a cloud computing environment. The MEC device 230 may provide services and computing functions, required by UEs 105, on edge nodes. The MEC device 230 may provide application services and content closer to UEs 105 and may implement network collaboration.

The inferencing engine 240 includes one or more devices capable of receiving, generating, storing, processing, providing, and/or routing information, as described elsewhere herein. The inferencing engine 240 may include a communication device and/or a computing device. For example, the inferencing engine 240 may include a server, such as an application server, a client server, a web server, a database server, a host server, a proxy server, a virtual server (e.g., executing on computing hardware), or a server in a cloud computing system. In some implementations, the inferencing engine 240 includes computing hardware used in a cloud computing environment. In some implementations, the inferencing engine 240 may include a machine learning model that generates inferences identifying issues associated with the RAN 110 (e.g., based on the network data and/or the device data) and confidence scores for the inferences.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
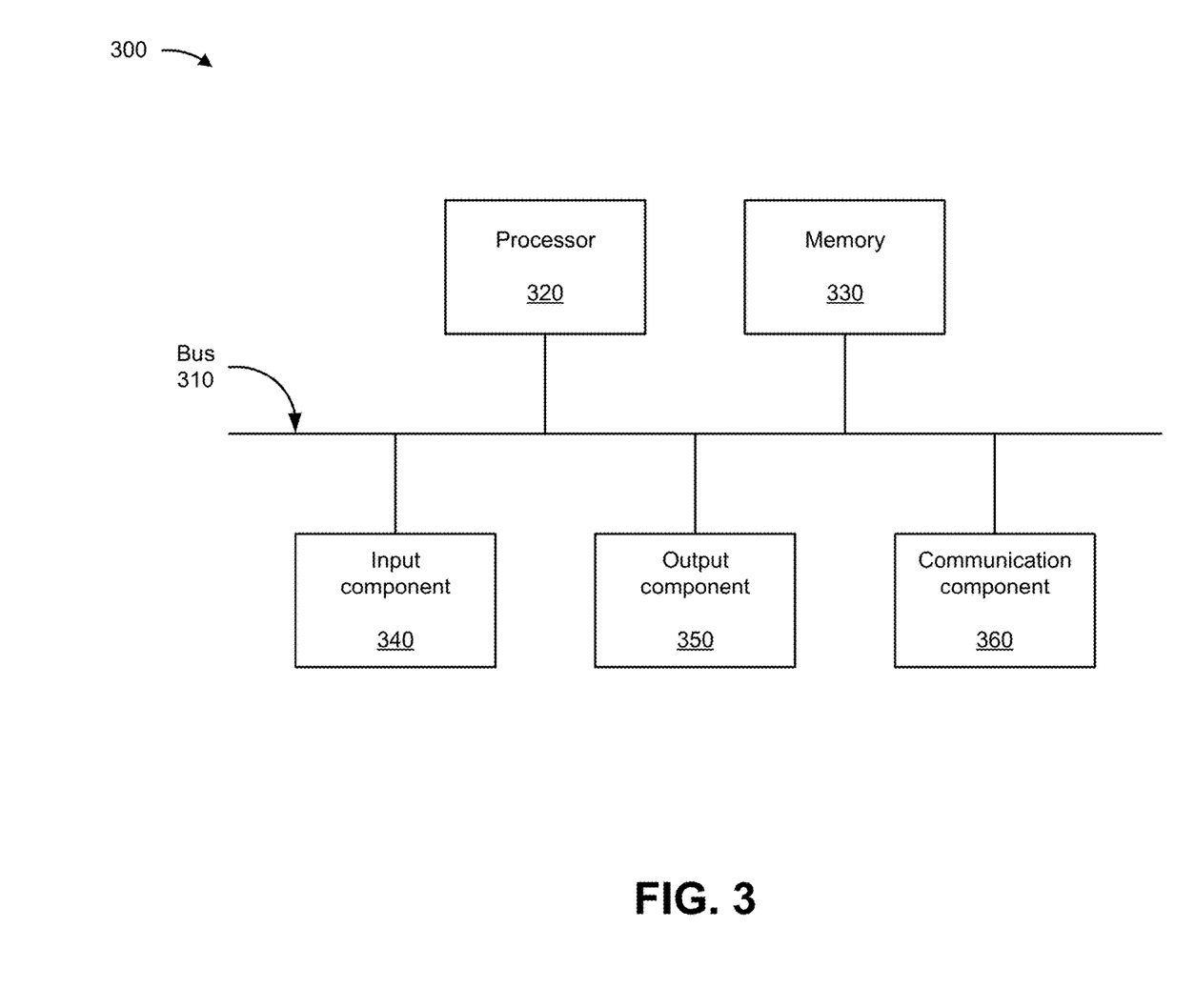
FIG. 3 is a diagram of example components of one or more devices of FIG. 2.

FIG. 3 is a diagram of example components of a device 300, which may correspond to the UE 105, the RAN 110, the optimization system 115, the MEC device 230, and/or the inferencing engine 240. In some implementations, the UE 105, the RAN 110, the optimization system 115, the MEC device 230, and/or the inferencing engine 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
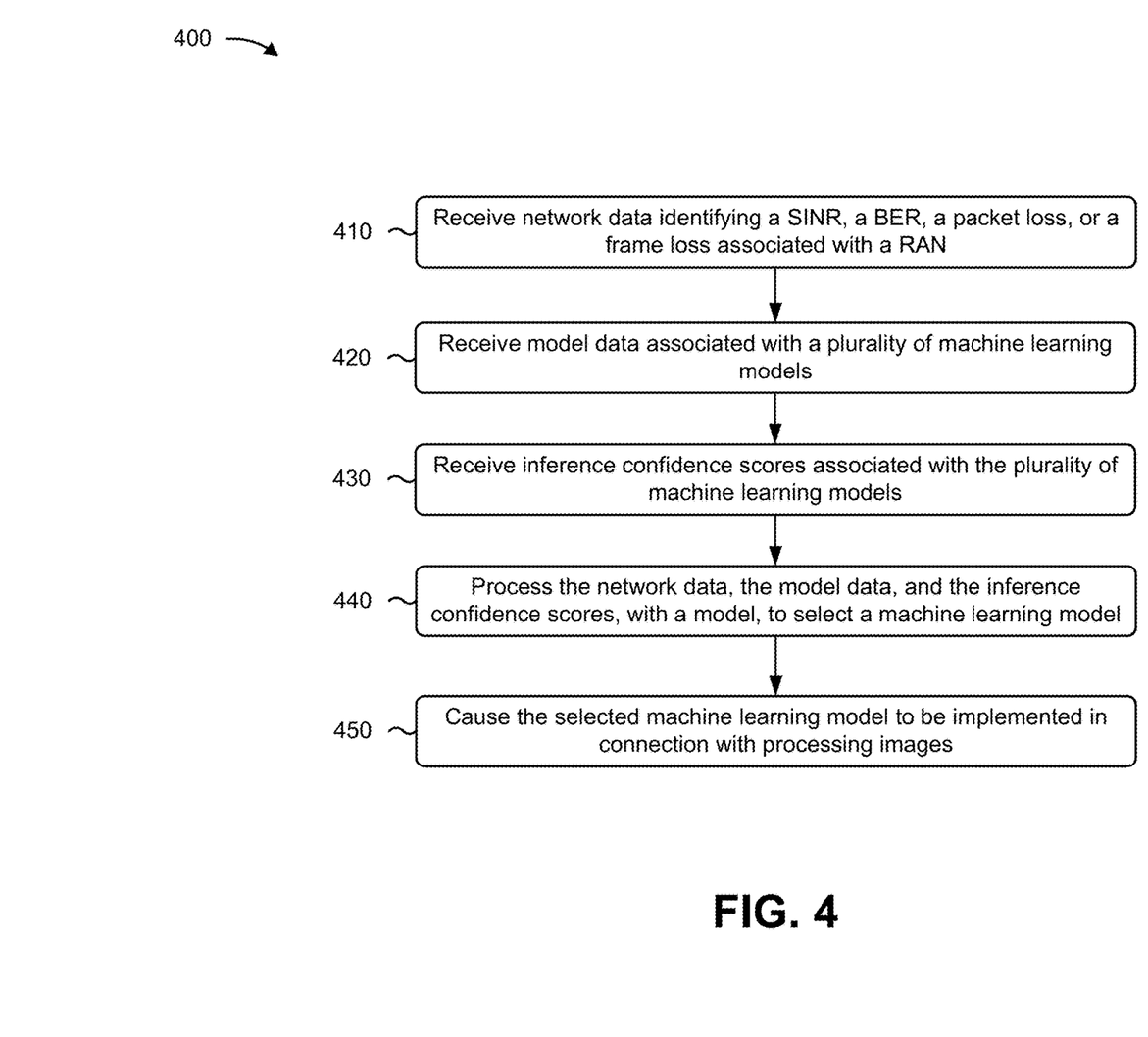
FIG. 4 is a flowchart of an example process for selecting a machine learning model and training images for the machine learning model.

FIG. 4 is a flowchart of an example process 400 for identifying and correcting issues associated with a wireless network. In some implementations, one or more process blocks of FIG. 4 may be performed by a device (e.g., the optimization system 115). In some implementations, one or more process blocks of FIG. 4 may be performed by another device or a group of devices separate from or including the device, such as an MEC device (e.g., the MEC device 230) and/or an inferencing engine (e.g., the inferencing engine 240). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving network data identifying an SINR, a BER, a packet loss, or a frame loss associated with a RAN (block 410). For example, the device may receive network data identifying at least one of an SINR, a BER, a packet loss, or a frame loss associated with a RAN, as described above.

As further shown in FIG. 4, process 400 may include receiving model data associated with a plurality of machine learning models (block 420). For example, the device may receive model data associated with a plurality of machine learning models, as described above. In some implementations, the model data includes one or more of historical latency data associated with the plurality of machine learning models, historical computing resource usage data associated with the plurality of machine learning models, or historical storage usage data associated with the plurality of machine learning models. In some implementations, each of the plurality of machine learning models is a computer vision machine learning model.

As further shown in FIG. 4, process 400 may include receiving inference confidence scores associated with the plurality of machine learning models (block 430). For example, the device may receive inference confidence scores associated with the plurality of machine learning models, as described above.

As further shown in FIG. 4, process 400 may include processing the network data, the model data, and the inference confidence scores, with a model, to select a machine learning model (block 440). For example, the device may process the network data, the model data, and the inference confidence scores, with a model, to select a machine learning model from the plurality of machine learning models, as described above. In some implementations, processing the network data, the model data, and the inference confidence scores, with the model, includes one or more of determining, for each of the plurality of machine learning models, whether the SINR associated with the RAN is greater than a first SINR threshold and less than a second SINR threshold; determining, for each of the plurality of machine learning models, whether the BER associated with the RAN is greater than a first BER threshold and less than a second BER threshold; determining, for each of the plurality of machine learning models, whether the packet loss associated with the RAN is greater than a first packet loss threshold and less than a second packet loss threshold; determining, for each of the plurality of machine learning models, whether the frame loss associated with the RAN is greater than a first frame loss threshold and less than a second frame loss threshold; or determining whether the inference confidence scores are less than a confidence threshold.

In some implementations, processing the network data, the model data, and the inference confidence scores, with the model, includes one or more of selecting, as the selected machine learning model, one of the plurality of machine learning models with a least historical latency, a least historical computing resource usage, or a least historical storage usage.

As further shown in FIG. 4, process 400 may include causing the selected machine learning model to be implemented in connection with processing images (block 450). For example, the device may cause the selected machine learning model to be implemented in connection with processing images, as described above. In some implementations, causing the selected machine learning model to be implemented includes causing the selected machine learning model to be implemented by an MEC device associated with the RAN. In some implementations, the MEC device utilizes the selected machine learning model to process images.

In some implementations, process 400 includes receiving image data identifying images to be processed by the selected machine learning model, receiving an inference confidence score associated with a quality of the image data, and processing the network data, the image data, and the inference confidence score, with another model, to select images, from the image data, for training the selected machine learning model. In some implementations, process 400 includes providing the selected images to the selected machine learning model for training. In some implementations, process 400 includes utilizing the selected images to train the selected machine learning model.

In some implementations, process 400 includes providing the selected images to the selected machine learning model for development of one or more new machine learning models. In some implementations, processing the network data, the image data, and the inference confidence score, with the other model, to select the selected images includes determining whether the SINR associated with the RAN is greater than an SINR threshold, determining whether the BER associated with the RAN is greater than a BER threshold, determining whether the packet loss associated with the RAN is greater than a packet loss threshold, determining whether the frame loss associated with the RAN is greater than a frame loss threshold, or determining whether the inference confidence score is less than a confidence threshold.

In some implementations, process 400 includes receiving updated network data and updated inference confidence scores, processing the updated network data, the model data, and the updated inference confidence scores, with the model, to select another machine learning model from the plurality of machine learning models, and causing the selected other machine learning model to be implemented.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, network data identifying at least one of a signal-to-interference-plus-noise ratio (SINR), a bit error rate (BER), a packet loss, or a frame loss associated with a radio access network (RAN);
   receiving, by the device, model data associated with a plurality of machine learning models;
   receiving, by the device, inference confidence scores associated with the plurality of machine learning models,
   wherein the inference confidence scores are predicted based on processing the network data with historical data associated with the plurality of machine learning models, and
   wherein the inference confidence scores are indicative of an accuracy of results generated by the plurality of machine learning models based on the plurality of machine learning models
   utilizing the network data to calculate the results;
   determining one or more machine learning models, of the plurality of machine learning models, to be considered for selection, the one or more machine learning models being determined based on values of the network data satisfying a first network threshold and a second network threshold for each of the one or more machine learning models;
selecting a machine learning model of the one or more machine learning models based on comparing a previously selected machine learning model with the selected machine learning model;
causing, by the device, the selected machine learning model to be implemented in connection with processing images;
processing the network data, image data identifying images to be processed by the selected machine learning model, and an inference confidence score associated with a quality of the image data, with another model, to select images, from the image data, for training the selected machine learning model; and
utilizing the selected images to train the selected machine learning model.

2. The method of claim 1, wherein the model data includes one or more of:
historical latency data associated with the plurality of machine learning models,
historical computing resource usage data associated with the plurality of machine learning models, or
historical storage usage data associated with the plurality of machine learning models.

3. The method of claim 1, wherein determining the one or more machine learning models comprises one or more of:
determining, for each of the plurality of machine learning models, whether the SINR associated with the RAN is greater than a first SINR threshold and less than a second SINR threshold;
determining, for each of the plurality of machine learning models, whether the BER associated with the RAN is greater than a first BER threshold and less than a second BER threshold;
determining, for each of the plurality of machine learning models, whether the packet loss associated with the RAN is greater than a first packet loss threshold and less than a second packet loss threshold;
determining, for each of the plurality of machine learning models, whether the frame loss associated with the RAN is greater than a first frame loss threshold and less than a second frame loss threshold; or
determining whether the inference confidence scores are less than a confidence threshold.

4. The method of claim 1, wherein selecting the selected machine learning model comprises one or more of:
selecting, as the selected machine learning model, one of the one or more machine learning models with a least historical latency, a least historical computing resource usage, or a least historical storage usage.

5. The method of claim 1, wherein each of the plurality of machine learning models is a computer vision machine learning model.

6. The method of claim 1, wherein causing the selected machine learning model to be implemented comprises:
causing the selected machine learning model to be implemented by a multi-access edge computing (MEC) device associated with the RAN.

7. The method of claim 6, wherein the MEC device utilizes the selected machine learning model to process images.

8. A device, comprising:
one or more processors configured to:
receive network data identifying at least one of a signal-to-interference-plus-noise ratio (SINR), a bit error rate (BER), a packet loss, or a frame loss associated with a radio access network (RAN);
receive model data associated with a plurality of machine learning models;
receive inference confidence scores associated with the plurality of machine learning models,
wherein the inference confidence scores are predicted based on processing the network data with historical data associated with the plurality of machine learning models, and
wherein the inference confidence scores are indicative of an accuracy of results generated by the plurality of machine learning models based on the plurality of machine learning models utilizing the network data to calculate the results;
determine one or more machine learning models, of the plurality of machine learning models, to be considered for selection, the one or more machine learning models being determined based on values of the network data satisfying a first network threshold and a second network threshold for each of the one or more machine learning models;
select a machine learning model of the one or more machine learning models based on comparing a previously selected machine learning model with the selected machine learning model;
cause the selected machine learning model to be implemented by a multi-access edge computing device associated with the RAN;
process the network data, image data identifying images to be processed by the selected machine learning model, and an inference confidence score associated with a quality of the image data, with another model, to select images, from the image data, for training the selected machine learning model; and
utilize the selected images to train the selected machine learning model.

9. The device of claim 8, wherein the one or more processors are further configured to:
receive the image data
and the inference confidence score,
wherein processing the network data, the image data, and the inference confidence score is based on receiving the image data and the inference confidence score.

10. The device of claim 8, wherein the one or more processors, to utilize the selected images to train the selected machine learning model, are configured to:
provide the selected images to the selected machine learning model for training.

11. The device of claim 8, wherein the one or more processors are further configured to:
provide the selected images to the selected machine learning model for development of one or more new machine learning models.

12. The device of claim 8, wherein the one or more processors, to process the network data, the image data, and the inference confidence score, with the other model, to select the selected images, are configured to:
determine whether the SINR associated with the RAN is greater than an SINR threshold;
determine whether the BER associated with the RAN is greater than a BER threshold;
determine whether the packet loss associated with the RAN is greater than a packet loss threshold;

determine whether the frame loss associated with the RAN is greater than a frame loss threshold; or
determine whether the inference confidence score is less than a confidence threshold.

13. The device of claim 8, wherein the one or more processors are further configured to:
receive updated network data and updated inference confidence scores;
process the updated network data, the model data, and the updated inference confidence scores to select another machine learning model from the plurality of machine learning models; and
cause the selected other machine learning model to be implemented.

14. A non-transitory computer-readable medium storing a set of instructions, the set of instructions comprising:
one or more instructions that, when executed by one or more processors of a device, cause the device to:
receive network data identifying at least one of a signal-to-interference-plus-noise ratio (SINR), a bit error rate (BER), a packet loss, or a frame loss associated with a radio access network (RAN);
receive model data associated with a plurality of machine learning models;
receive inference confidence scores associated with the plurality of machine learning models,
wherein the inference confidence scores are predicted based on processing the network data with historical data associated with the plurality of machine learning models, and
wherein the inference confidence scores are indicative of an accuracy of results generated by the plurality of machine learning models based on the plurality of machine learning models utilizing the network data to calculate the results;
determine one or more machine learning models, of the plurality of machine learning models, to be considered for selection, the one or more machine learning models being determined based on values of the network data satisfying a first network threshold and a second network threshold for each of the one or more machine learning models;
select a machine learning model of the one or more machine learning models based on comparing a previously selected machine learning model with the selected machine learning model;
cause the selected machine learning model to be implemented;
receive image data identifying images to be processed by the selected machine learning model;
receive an inference confidence score associated with a quality of the image data;
process the network data, the image data, and the inference confidence score, with another model, to select images, from the image data, for training the selected machine learning model; and
utilize the selected images to train the selected machine learning model.

15. The non-transitory computer-readable medium of claim 14, wherein the model data includes one or more of:
historical latency data associated with the plurality of machine learning models,
historical computing resource usage data associated with the plurality of machine learning models, or
historical storage usage data associated with the plurality of machine learning models.

16. The non-transitory computer-readable medium of claim 14, wherein the one or more instructions, that cause the device to determine the one or more machine learning models, cause the device to:
determine, for each of the plurality of machine learning models, whether the SINR associated with the RAN is greater than a first SINR threshold and less than a second SINR threshold;
determine, for each of the plurality of machine learning models, whether the BER associated with the RAN is greater than a first BER threshold and less than a second BER threshold;
determine, for each of the plurality of machine learning models, whether the packet loss associated with the RAN is greater than a first packet loss threshold and less than a second packet loss threshold;
determine, for each of the plurality of machine learning models, whether the frame loss associated with the RAN is greater than a first frame loss threshold and less than a second frame loss threshold; or
determine whether the inference confidence scores are less than a confidence threshold.

17. The non-transitory computer-readable medium of claim 14, wherein the one or more instructions further cause the device to:
provide the selected images to the selected machine learning model for training.

18. The non-transitory computer-readable medium of claim 14, wherein the selected machine learning model is implemented by a multi-access edge computing device associated with the RAN.

19. The non-transitory computer-readable medium of claim 14, wherein the one or more instructions, that cause the device to process the network data, the image data, and the inference confidence score, with the other model, to select the selected images, cause the device to:
determine whether the SINR associated with the RAN is greater than an SINR threshold;
determine whether the BER associated with the RAN is greater than a BER threshold;
determine whether the packet loss associated with the RAN is greater than a packet loss threshold;
determine whether the frame loss associated with the RAN is greater than a frame loss threshold; or
determine whether the inference confidence score are less than a confidence threshold.

20. The non-transitory computer-readable medium of claim 14, wherein each of the plurality of machine learning models is a computer vision machine learning model.

* * * * *